US008924884B2

(12) United States Patent  (10) Patent No.: US 8,924,884 B2
Bank et al.  (45) Date of Patent: Dec. 30, 2014

(54) AUTOMATICALLY CAPTURING AND ANNOTATING CONTENT

(75) Inventors: Judith H. Bank, Morrisville, NC (US); Lisa M. W. Bradley, Cary, NC (US); Lin Sun, Morrisville, NC (US); Chunhui Yang, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 896 days.

(21) Appl. No.: 12/961,055

(22) Filed: Dec. 6, 2010

(65) Prior Publication Data

US 2012/0144286 A1  Jun. 7, 2012

(51) Int. Cl.
*G06F 17/00* (2006.01)
*G06F 17/24* (2006.01)
*G06F 9/44* (2006.01)

(52) U.S. Cl.
CPC ............ *G06F 17/241* (2013.01); *G06F 9/4443* (2013.01)
USPC ........... 715/781; 715/233; 715/273; 715/230; 715/231; 715/232; 715/705; 715/709; 715/799; 715/204; 715/247; 715/708; 709/224; 719/318; 717/104; 345/619

(58) Field of Classification Search
CPC ..... G06F 3/0308; G06F 3/033; G06F 3/0933; H04L 43/09
USPC ......... 715/705–715, 781, 233, 273, 230–232; 719/318; 717/104; 345/619
See application file for complete search history.

(56) References Cited

U.S. PATENT DOCUMENTS

| 7,036,079 | B2 | 4/2006 | McGlinchey et al. | |
|---|---|---|---|---|
| 7,970,263 | B1* | 6/2011 | Asch | 386/350 |
| 2006/0036991 | A1* | 2/2006 | Biazetti et al. | 717/104 |
| 2007/0250699 | A1 | 10/2007 | Dube et al. | |
| 2008/0189648 | A1* | 8/2008 | Anglin et al. | 715/781 |
| 2009/0049383 | A1* | 2/2009 | Haynes et al. | 715/711 |
| 2009/0083710 | A1 | 3/2009 | Best et al. | |
| 2009/0172703 | A1* | 7/2009 | Nakano et al. | 719/318 |
| 2009/0249216 | A1* | 10/2009 | Charka et al. | 715/744 |

OTHER PUBLICATIONS

"How to Capture a scrolling web page window using SnagIt" Published by Trademark Law library Jun. 4, 2007 total 3 pages.*
"ViewletBuilder", *Qarbon* Obtained from internet Dec. 1, 2010. http://www.qarbon.com/presentation-software/viewletbuilder/ 2010, 4 pages.

* cited by examiner

*Primary Examiner* — Quoc A Tran
(74) *Attorney, Agent, or Firm* — DeLizio Gilliam, PLLC (57) ABSTRACT

Some embodiments of the inventive subject matter are directed to detecting a modification of content presented on a display. The detecting of the modification of the content is in response to user input. Some embodiments are further directed to generating a screen capture of at least the modified content in response to detecting the modification of the content. Some embodiments are further directed to identifying an area of the screen capture in which the modification of content occurred. Some embodiments are further directed to adding a graphical annotation to the screen capture.

25 Claims, 10 Drawing Sheets

910 — CAPTURE-MODE SETTINGS    (WHAT TOGGLES SCREEN CAPTURE MODE)

ON:  [CTRL ▼] + [F10 ▼]   ⟵ 901
OFF: ☐ CLICK [SAVE ▼] OR [CLOSE ▼]   ⟵ 902
     ☐ [10 ▼] [MIN ▼] EXPIRE   ⟵ 903
     ☐ NEXT [10 ▼] SCREENS   ⟵ 904

920 — CAPTURE ACTIVITY TRIGGERS   (WHAT TRIGGERS A SCREEN CAPTURE)

921 — ○ EACH ACTIVITY ON PANEL   ○ A NUMBER OF MODIFICATIONS [▼]
      ● ACTIVE PANEL CHANGE   ☐ NEXT  ☐ PG. DOWN  ☐ SCROLL  ☐ FRAME
922 — ☐ AUTO ANALYZE
923 — ☐ MANUAL INDICATION [CTRL ▼] + [R MOUSE ▼]

930 — CAPTURE CONTENT SETTINGS (WHAT IS CAPTURED)

931 — ☐ ACTIVE PANEL
932 — ☐ MULTI-PANEL W/ MANUAL INDICATION [CTRL ▼] + [SHIFT ▼]
933 — ☐ IGNORE ERRORS
934 — ☐ REAL-TIME PREVIEW

940 — ANNOTATION SETTINGS (HOW ANNOTATIONS ARE MADE)

941 — TEXT CHANGE                         [HIGHLIGHT ▼][YELLOW ▼]
942 — FEATURE ACTIVATION                  [BOX ▼]
943 — [CTRL ▼] + [R-MOUSE ▼] + [LOOP ▼]   [POPUP ▼]

944 — FONT: [ARIAL ▼] [10 PT ▼]
      ☐ HIGH LEVEL ANNOTATIONS    ☐ SUMMARIZE ANNOTATIONS
      ☐ LOW-LEVEL ANNOTATIONS     ☐ SOUND ANNOTATE

950 — ORGANIZATION OPTIONS

SAVE TO [FILE NAME ▲]   ⟵ 951
952 — ☐ DOC  ☐ VIDEO  ☐ PDF  ☐ PPT  ☐ OTHER

AUTOMATICALLY CAPTURING AND ANNOTATING CONTENT

BACKGROUND

Embodiments of the inventive subject matter generally relate to the field of data processing, and, more particularly, to capturing content.

Screen capturing is a procedure for copying a view of a graphical user interface (e.g., a view of an application window or a view of a computer desktop). A user can initiate a type of screen capture known as a screen shot, for example, by pressing the "print screen" button on a computer's keyboard. The computer will copy a visual image of a current state of the computer's desktop view into a buffer or clipboard. A user can then paste the screen capture into the body of a document. Screen capturing can be useful for generating instructional material, such as tutorials. However, screen capturing is limited.

SUMMARY

Some embodiments of the inventive subject matter include a computer-implemented method directed to detecting a modification of content presented on a display. The detecting of the modification of the content is in response to a user action. In some embodiments, the computer-implemented method is further directed to generating a screen capture of at least the modified content in response to detecting the modification of the content. In some embodiments, the computer-implemented method is further directed to identifying an area of the screen capture in which the modification of content occurred. In some embodiments, the computer-implemented method is further directed to adding a graphical annotation to the screen capture. The graphical annotation indicates at least one of the identified area of the screen capture in which the modification of content occurred, the modification of the content, and the user action.

Some embodiments include a computer program product for automatically annotating screen captures. The computer program product can include a computer readable storage medium having computer readable program code embodied therewith. The computer readable program code can be configured to detect a plurality of interactions, via a plurality of user actions, with portions of content presented on a graphical user interface, where the portions of the content are configured to respond to the user actions. In some embodiments, the computer readable program code can further be configured to generate a series of screen captures of the content corresponding to the plurality of interactions in response to a detection of the plurality of interactions. In some embodiments, the computer readable program code can further be configured to generate a plurality of graphical annotations in response to generation of the series of screen captures, where each of the plurality of graphical annotations describes a respective one of the plurality of interactions. In some embodiments, the computer readable program code can further be configured to organize the series of screen captures into a unit and add the plurality of graphical annotations to the unit. Each of the plurality of graphical annotations is associated with a screen capture of the series of screen captures corresponding to the interaction of the plurality of interactions described by the respective graphical annotation.

Some embodiments are directed to an apparatus with a processor, and a computer readable storage medium having computer usable program code embodied therewith. The computer usable program code is executable by the processor to cause the apparatus to initiate a content-capture mode in response to a first trigger and detect a change of content from a first state to a second state during the content capture mode, where the content is configured to change state in response to user input. In some embodiments, the computer usable program code is further executable by the processor to cause the apparatus to generate a representation of the content in the second state in response to detecting the change from the first state to the second state and identify an area of the representation associated with the content. In some embodiments, the computer usable program code is further executable by the processor to cause the apparatus to generate a visual indicator in response to generating the representation of the content. The visual indicator indicates the change of the content from the first state to the second state. In some embodiments, the computer usable program code is further executable by the processor to cause the apparatus to combine the visual indicator with the representation of the content and terminate the content-capture mode in response to a second trigger. Combining the visual indicator with the representation of the content comprises associating the visual indicator with the area of the representation associated with the content.

Some embodiments include a computer-implemented method directed to detecting a plurality of modifications that occur to one or more user-configurable portions of content displayed via a processor, wherein the plurality of modifications occur in response to a plurality of user inputs associated with the one or more user-configurable portions of the content. In some embodiments, the computer-implemented method is further directed to generating at least one screen capture that depicts one or more modifications of the plurality of modifications in response to said detecting the plurality of modifications that occur to the one or more user-configurable portions of the content. In some embodiments, the computer-implemented method is further directed to generating a plurality of graphical indicators, where each of the plurality of graphical indicators describes one or more of the plurality of modifications that occur to the one or more user-configurable portions of the content. In some embodiments, the computer-implemented method is further directed to superimposing the plurality of graphical indicators over portions of the at least one screen capture, where the portions of the at least one screen capture correspond to locations of depictions of each of the one or more user-configurable portions of the content on the at least one screen capture.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to capturing graphical representations of views on a graphical user interface, other instances may include capturing frames of video, audio, animations, some combinations thereof, etc. In other instances, well-known instruction instances, protocols, structures, and techniques have not been shown in detail in order not to obfuscate the description.

As specified previously, screen capturing can be used to create instructional material (e.g., tutorial documents, manuals, etc.) technical documents, etc. However, conventional screen capturing is limited and requires a user to manually take screen captures, and manually manipulate them (e.g., manually crop them, manually resize them, etc.). Further, a user must manually organize and annotate the screen captures (e.g., manually paste graphics over screen captures, etc.).

Embodiments of the inventive subject matter, however, can track interactions and/or modifications to content and automatically capture, or record, portions of content that are modified and/or affected by the interactions. Embodiments can further automatically generate annotations based on the interactions and/or modifications and associate or integrate the annotations with the captured portions of content. Embodiments can further organize captured portions of content into units (e.g., files, images, documents, slide-shows, videos, web pages, etc.).

Figure 1:
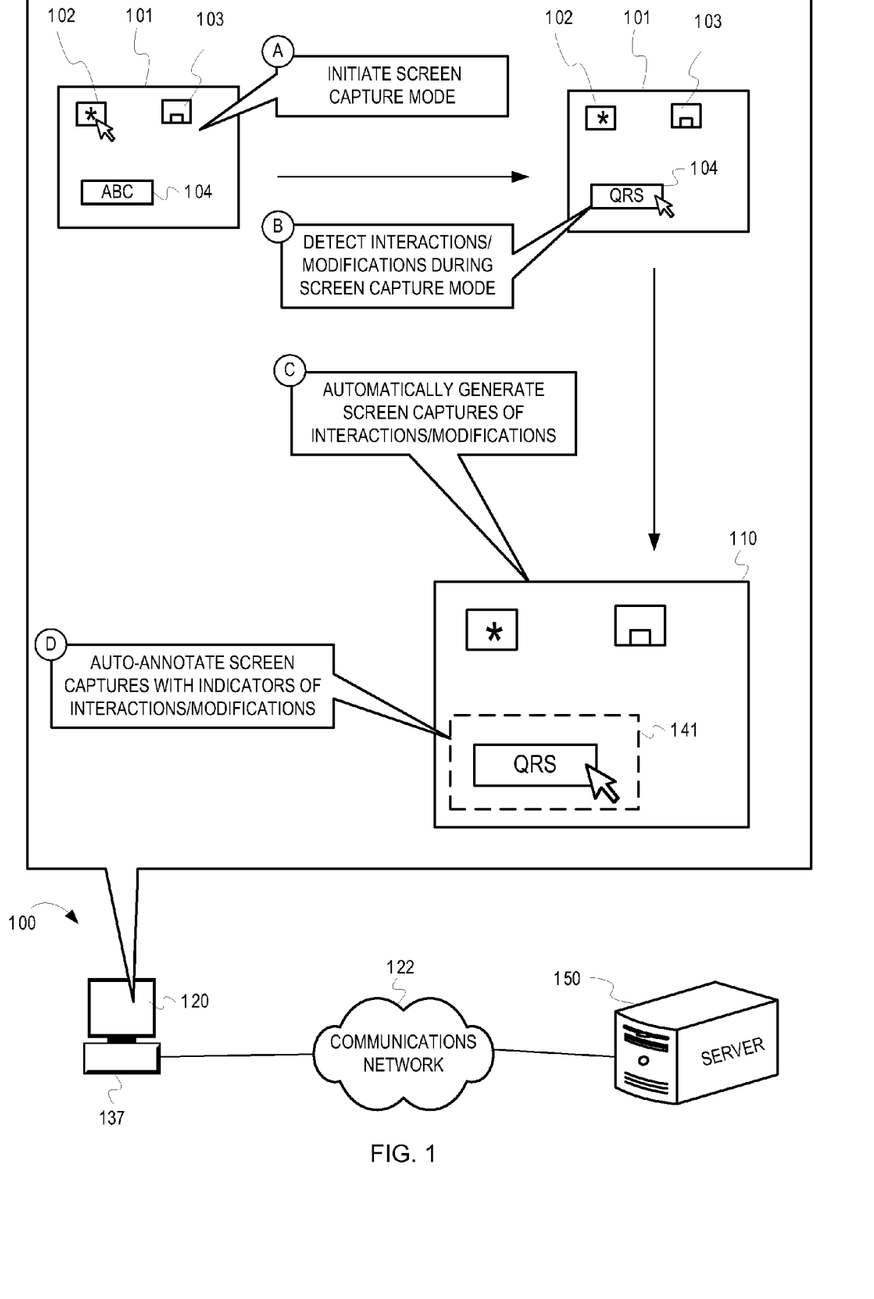
FIG. 1 is an example conceptual diagram of automatically generating and annotating screen captures.

FIG. 1 is an example conceptual diagram of automatically generating and annotating screen captures. In FIG. 1, a system 100 includes a computer 137 configured to receive user input (e.g., via a keyboard, a mouse, etc.). The computer 137 presents content, such as a panel 101, on a display 120. The computer 137 can also be connected to a server 150 via a communications network 122. One or more components of the system 100, such as the computer 137 or the server 150, automatically detects that interactions occur with the content and/or that modifications occurred to the content, generates content captures related to the interactions, and generates annotations related to the interactions and/or the modifications that occur.

For example, at stage "A," the system 100 initiates a screen-capture mode (e.g., the system 100 detects that a user clicks a first control 102 on the panel 101 which the system 100 interprets as cue to initiate the screen-capture mode).

At stage "B," the system 100 detects activity that occurs to portions of the content during the screen-capture mode (e.g., the system 100 detects interactions with portions of the panel 101). The activity may be performed by the user, by a group of users, by code, by components of the system 100, etc. The activity causes modifications to occur to portions of the content. For example, the system 100 detects that some activity causes text to change within a field 104 (e.g., change from "ABC" to "QRS").

At stage "C," the system automatically generates the screen shot 110 in response to the modifications (e.g., in response to the text changing in field 104). In other words, instead of detecting a user input that specifically activates a screen capture instruction, the system deduces that a screen-capture should be taken after the text changed in the field 104, and automatically takes the screen shot 110 of the panel 101. The system 100 can further generate an additional screen shot when activity modifies other portions of the panel 101. In some embodiments, the system can track a number of activities before taking a screen shot, such as tracking all changes made on the panel 101 before the panel is deactivated (e.g., take the screen shot 110 when a user closes the panel 101). In some embodiments, the system 100 captures the screen shot 110 based on whether pre-defined activities occur and/or based on a degree or characteristic of the activity. For example, the system 100 can capture the screen shot 110 based on whether the activity modifies a position of the content, based on whether the activity opens a window, a panel, a menu, etc., based on whether the activity modifies text, numbers, symbols, or other values in the content, based on whether the activity selects a list option, a dropdown, a toolbar, etc., based on whether a panel is deactivated or advances to a new panel, etc.

Further, at stage "D," the system 100 automatically annotates the screen shot 110 based on the activity that occurred to portions of the content during the screen-capture mode. For example, the system 100 associates a graphical indicator 141 on the screen shot 110 (e.g., positions a graphical image of a border that surrounds a depiction of the field 104 on the screen shot 110). The system can further detect additional activity (e.g., detect that a user clicks on a second control 103) which the system 100 can interpret as a cue to end the screen capture mode. The system 100 can further automatically organizes the screen shot 110 into a unit such as a file, a document, an image, a webpage, a video, an audio track, a slide-show, a spreadsheet, a map, a widget, an email, etc. For instance, the system 100 can arrange the screen shot 110 within a body of a document.

Figure 2:
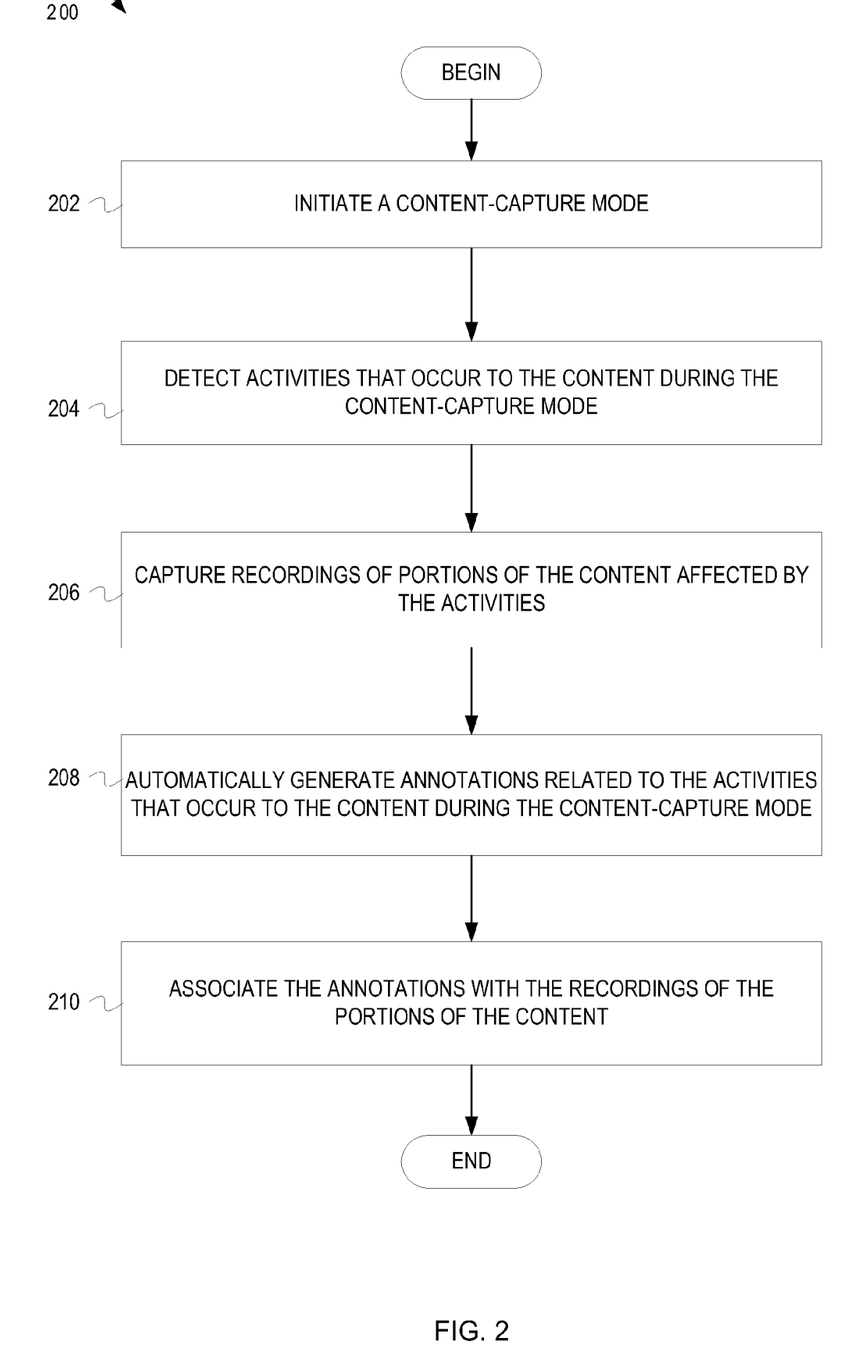
FIG. 2 is a flowchart depicting example operations of a flow 200 for automatically annotating and organizing content captures.

FIG. 2 is a flowchart depicting example operations of a flow 200 for automatically annotating and organizing content captures. For exemplary purposes, operations associated with the flow 200 in FIG. 2 will be described as being performed by a system (e.g., a computer, a server, a controller, a module, a program, etc.) which may, for example, include any or all of the elements described in FIGS. 1, and 3-10. FIG. 2 will refer to FIGS. 3-9 to illustrate one example of the flow 200 described in FIG. 2.

Referring to FIG. 2, the system initiates a content-capture mode (202). In some embodiments, the system can detect a first trigger that initiates the content-capture mode. The first trigger may be a user activated indicator or input (e.g., a user clicks a button on a graphical user interface using a mouse cursor, a user provides an audible instruction via a microphone, etc.) that indicates to the system to begin capturing content. In other embodiments, the system detects an activity that can be interpreted as a trigger and initiates the content-capture mode automatically (e.g., the system detects opening of one of more applications that can be used to create a tutorial and deduces that a content-capture mode should begin). In other embodiments, the system automatically initiates a content-capture mode based on a pre-specified indicator (e.g., the system detects a user-specified setting that specifies to begin capturing content when a specific application or file is opened).

Figure 3:
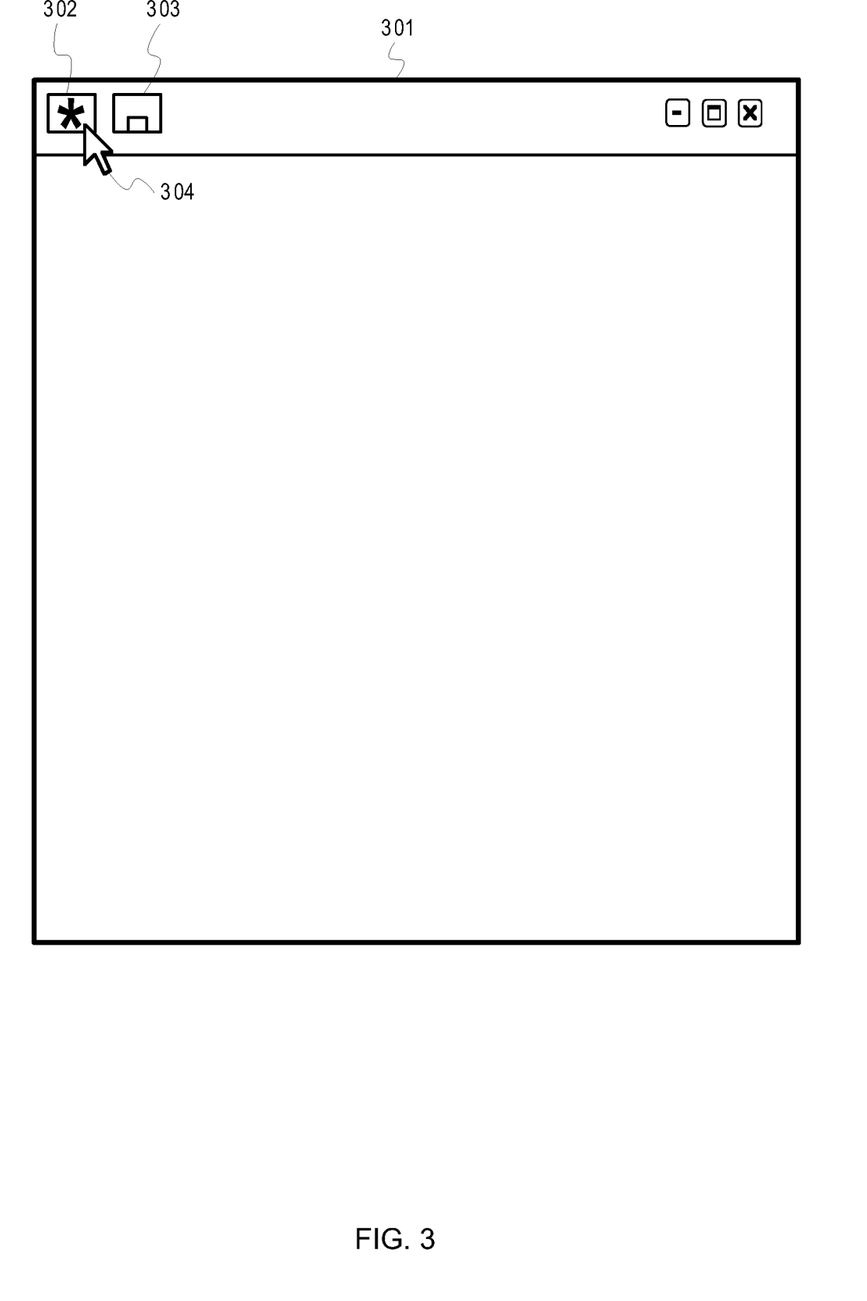
FIGS. 3-9 are example conceptual diagrams that depict automatically annotating and organizing content captures into a web document.
Figure 4:
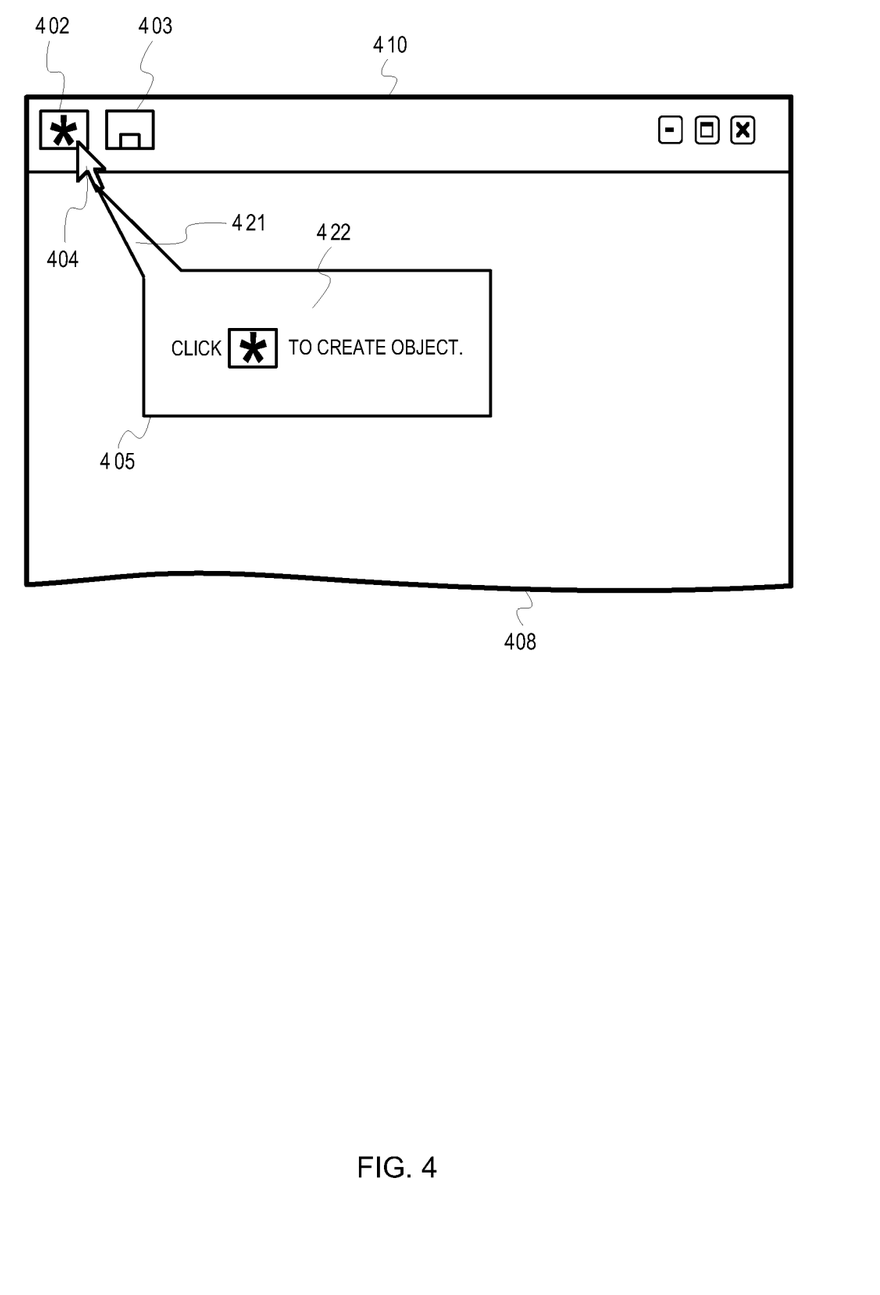
Figure 5:
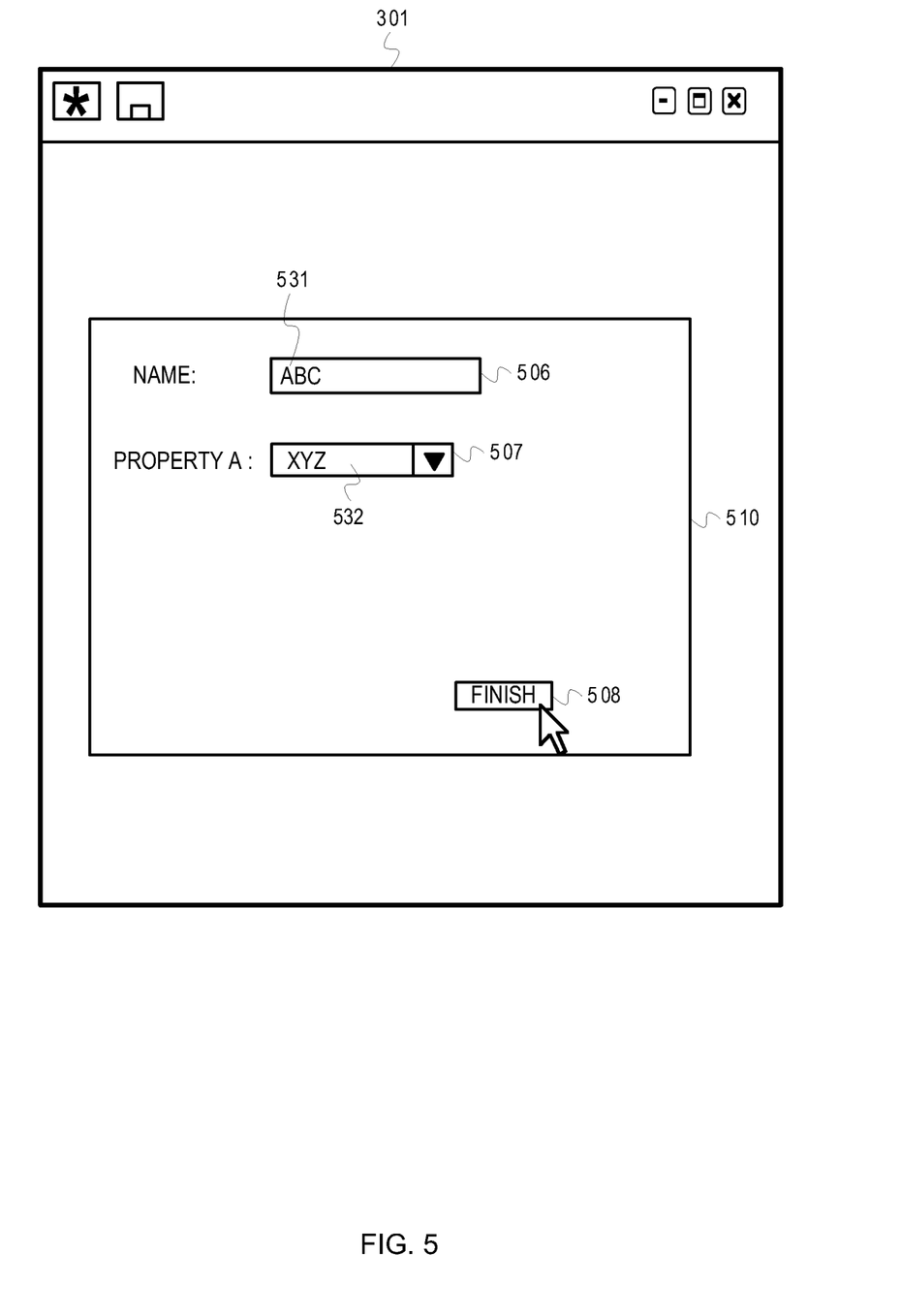
Figure 6:
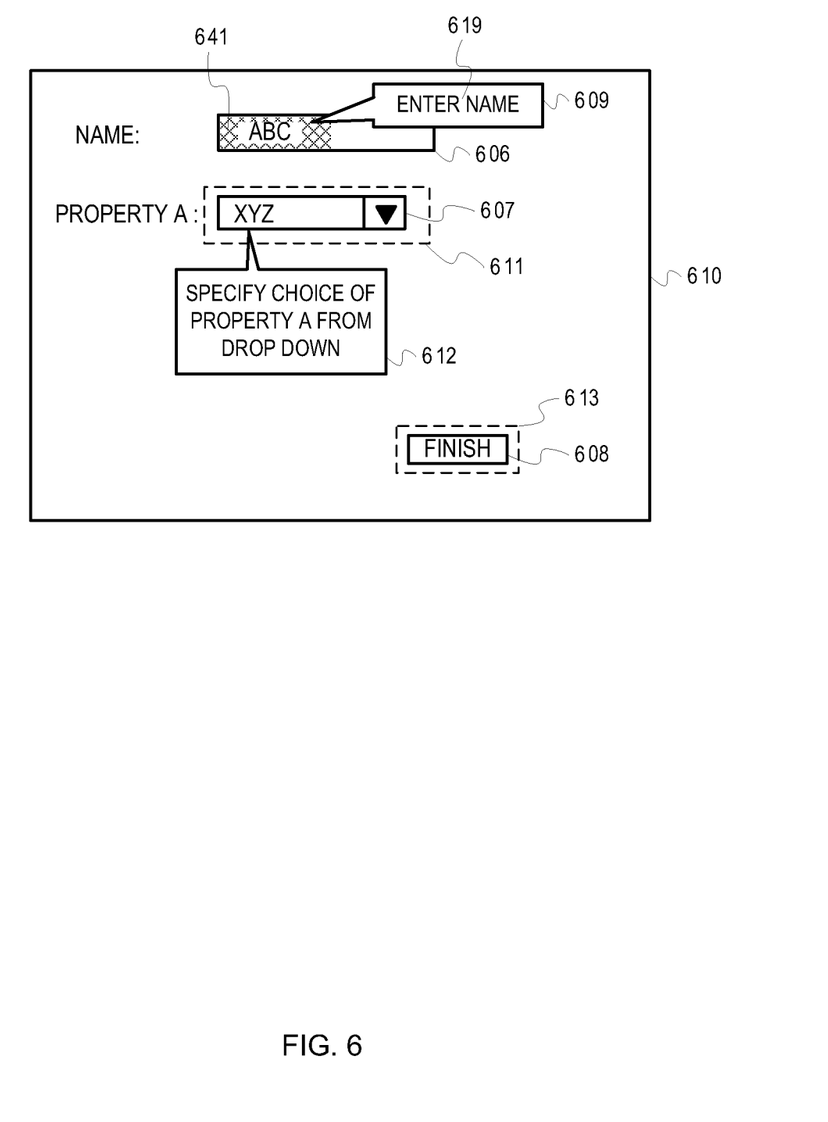

The system further detects activities that occur to the content during the content-capture mode (204). The activities can be user activity and/or non-user activity. In FIG. 3, for example, a window 301 includes a first control 302 and a second control 303. The first control 302 is used to create an object. The second control 303 is used to save the object once created. The system detects a user selection of the first control 302 during the screen capture mode. The system, for instance, detects that a mouse cursor 304 is placed over the first control 302 and a mouse-click event is activated.

Referring again to FIG. 2, the system further captures recordings of portions of the content affected by the activities (206). The recording of the portions of the content may be referred to as content capturing. In other words, the system can take recordings of one or more states of the content ("content captures"). The system can take the content captures via a clipboard application or other mechanisms for storing data in short-term memory storage (e.g., in a buffer, a clipboard, a volatile memory store, etc.). In other embodiments, the system can store the content captures in longer term memory (e.g., in a cache, on a hard drive, etc.). In some embodiments, content capturing may include, but not be limited to graphical image captures (e.g., screen captures, screen shots, thumb-shots, etc.), video captures (e.g., screen-casts, video grabs, frame-shots, etc.), audio captures (e.g., sound sampling), or any combination (e.g., captures of multi-media presentations, captures of intervals of animations, etc.). If the content is presented as static content (e.g., a graphic, a document, a web page, etc.), then the system can capture a solitary portion (e.g., a snap-shot) of the static image's appearance at one moment in time. If the content is presented as dynamic content (e.g., a video, an animation, etc.), then the system can capture either a solitary portion of the content (e.g., one frame of the dynamic content at one moment in time) or a grouped portion of the content (e.g., a clip, a series of audio or video frames, a group of bits in a data stream, etc. of the content over multiple moments in time). The system can perform the content capturing based on an order (e.g., chronological order), or sequence, of the activities, such as via a series of activities that cause a screen or panel to appear visually different after each of the activities. The system can detect when data changes (e.g., text changes, a dropdown menu changes, etc.) and generate a content capture in response to the change in the data. The system can also detect user inputs that interact with the content (e.g., a keyboard stroke that changes the content, a mouse cursor movement associated with the content, mouse-clicks that select portions of the content, a drag-and-drop onto or of a portion of the content, etc.). Based on the user inputs that interact with the content, the system performs content captures.

Referring still to FIG. 2, the system further automatically generates annotations related to the activities that occur to the content during the content-capture mode (208) and associates the annotations with the recorded portions of the content (210). In one embodiment, the system can capture video of the content (e.g., of an application window, a graphical user interface, a form, etc.) and detect changes to all portions of the content over a time span or period. The system can use the video to create content captures with highlighting (e.g., semi-transparent colors layers, localized background coloring, field fills, shading, shadows, borders, etc.) that show the most recent updates to the portions of the content (e.g., colored highlighting to text changes in fields on a form or window).

In another embodiment, the system can link a content-capturing program with a window or panel. The system tracks interactions via user inputs (e.g., clicks, typing, etc.) that occur within the window or panel and detects positions, or coordinates, of the interactions. At some later point, when the system generates a content capture, the system uses the positions or coordinates to associate or integrate (e.g., combine, superimpose, overlay, affix, anchor, attach, etc.) indicators, or annotations, of the interactions with the positions or coordinates at which the interactions occurred. For example, the system can start tracking the interactions when the panel first appears and stop tracking the interactions when the panel is deactivated (e.g., when a user indicates to move to a next panel). While the panel first appears, the system tracks and stores data related to the interactions that occur. At the moment that the panel is deactivated (e.g., when the user indicates to move to the next panel) the system can generate the content capture of the deactivated panel, generate annotations (e.g., visual indicators) of the interactions and/or of modifications that occurred as a result of the interaction, and associate or integrate the annotations with the content capture at the positions or coordinates at which the interactions occurred.

In other embodiments, the system can capture a specific number or amount of activities or interactions (e.g., activity over a period of a number of minutes, activity that occurred over a number of steps, etc.). Once the specific number or amount or activities or interactions is attained, the system can create the content-capture and associate annotations (e.g., overlay visual indicators) that indicate the activities or interactions. If activities or interactions span multiple panels, the system can generate multiple content captures.

In the example of FIG. 3, the system detects the action by the mouse pointer 304 that clicks the first control 302. In response, the system (in FIG. 4) generates a screen capture 410 of the window 301. The screen capture 410 is a snap-shot of at least a portion of the window 301. The system can modify the screen capture 410 to focus only portions of the window 301 that were interacted with and/or modified. For example, the system crops the bottom border 408 of the screen capture 410. The screen capture 410 is a depiction of the appearance of the window 301 at the moment that the first control 302 was activated or selected. For example, the screen capture 410 includes a depiction 402 of the first control 302, as well as a depiction 404 of the mouse pointer 304. Further, still referring to FIG. 4, the system generates a callout graphic 405 with a stem 421 and text 422. The system positions (e.g., overlays, superimposes, layers, pastes, etc.) the callout graphic 405 over the screen capture 410 and positions the stem 421 to touch the depiction 402 of the first control 302. The system further generates the text 422 to be within a body of the callout graphic 405. The text 422 summarizes the nature of the activity performed at the moment that the screen capture 410 was taken. The system can cause the text 422 to describe the activity in the form of a tutorial instruction (e.g., an instruction or step used in a tutorial). For example, the system indicates, via the text 422 to click on the first control 302 to create an object. In some embodiments, the system may create a multi-layered object that includes graphical and textual elements. For example, the screen capture 410 may be one layer, the graphical callout 405, may be a second layer, and the text 422 may be a third layer. By layering, the system can keep annotations separate from each other and can cause the annotations to be multiple types, or forms, of content. For instance, the system can cause the text 422 to be characters (e.g., American Standard Code for Information Interchange, or ASCII characters) instead of pixilated representations of characters. In some embodiments, the system can combine layers (e.g., flatten layers into a composite image). In some embodiments, the system can animate some of the layers so that the annotations can be dynamic (e.g., appear or disappear, fade in or out, move, toggle on or off, etc.). The system can also associate functions with the layers so that they respond to user actions (e.g., the system creates a slide for a slide-show from a screen capture, associates an annotation layer with the slide, and modifies properties of the annotation layer to fade in and out of view on a screen capture based on a mouse-click event). The system can also generate annotations according to user preferences (e.g., see FIG. 9 below where a user can specify a type of graphical image, a type of text, a type of highlighting, etc. to be used for annotations).

In some embodiments, the system tracks a plurality of the activities and makes annotations for the plurality of the activities on a single content capture. For example, after the system detects, in FIG. 3, that the first control 302 was selected, the application associated with the window 301 launches, in FIG. 5, a panel 510. The panel 510 includes a text field 506, a dropdown control 507, and a completion button 508. The text field 506 specifies a name for the object being created. The dropdown control 507 specifies a type of property (e.g., property "A") that defines the object being created. The system detects multiple activities after the panel 510 is presented. For instance, the system detects that text 531 (i.e., the text "ABC") is entered into the text field 506, an option 532 (i.e., the value "XYZ") is selected on the dropdown control 507, and the completion button 508 is activated. The system can, in FIG. 6, generate a screen capture 610 of the panel 510 after the completion button 508 is activated. The screen capture 610 specifies the activities (e.g., the interactions, the modifications, etc.) that occurred after the panel 510 launched and before the completion button 508 was activated (i.e., tracks the modification to the text field 506 and the use of the dropdown control 507), and consequently, when the system generates the screen capture 610, the system can generate annotations for all changes that occurred on the panel as a result of the activities. For example, the system generates a highlight annotation (i.e., highlighting graphic 641) that coincides with a depiction 606 of the text field 506. Further, the system generates a callout 609 that characterizes (e.g., defines or describes) the activity that occurred to the text field 506. The system positions the callout 609 to point to the depiction 606 of the text field 506. The system can determine a type of detail to include in the callout 609. For example, the system can generate text 619 that describes a summary of activity (e.g., "Enter name," meaning an annotative instruction that specifies to enter a name for the object) as opposed to a summary of the modification (e.g., "Enter 'ABC'" meaning an annotative instruction to enter a specific value into the text field 506). The system further generates a graphical box 611 around a depiction 607 of the dropdown control 507. The system can further generate a callout 612 that summarizes activity that occurred to the dropdown 507 (e.g., the callout 612 reads "Specify choice of property A from dropdown," meaning an annotative instruction to select an option from the dropdown 507). Further, the system generates a graphical box 613 around a depiction 608 of the completion button 508. The system can further generate a callout that describes the activity that occurred to the completion button 508 (e.g., the callout reads "Select 'Finish'" meaning an annotative instruction to select the completion button 508). In other embodiments, however, the system may refrain from adding some or any callouts, such as callouts that indicate actions that are already clearly indicated via the content or that are repetitive (e.g., refrain from generating a callout for the completion button 508). In some embodiments, instead of tracking activities as they occur, the system can compare images of the content before and after a trigger occurs to generate a screen capture. For example, the system can compare a first image of the panel 510 when it was first presented (i.e., before modifications) with a second image of the panel 510 when the completion button 508 is activated. The system can, via the comparison of the first and second images, detect changes that appear to have changed, visually, on the panel 510 and generate annotations that describe activities that must have occurred to cause the change in appearance on the panel 510. In other embodiments, the system can generate screen captures after each of the activities (e.g., after the text field 506 is modified and after the dropdown control 507 is used), and consolidate the screen captures into a single screen capture. In other embodiments, the system can automatically focus on portions of a screen capture that was modified (e.g., show a depiction of the text field 506 in one screen capture, show a depiction of the dropdown control 507 in another screen capture, etc.). In some embodiments, the system can also detect activities that affect metadata (e.g., detect when metadata changes). For example, a change to metadata may not visually appear on the panel 510, however the system can still detect that the change occurred to the metadata and generate annotations regarding the change to the metadata.

Figure 7:
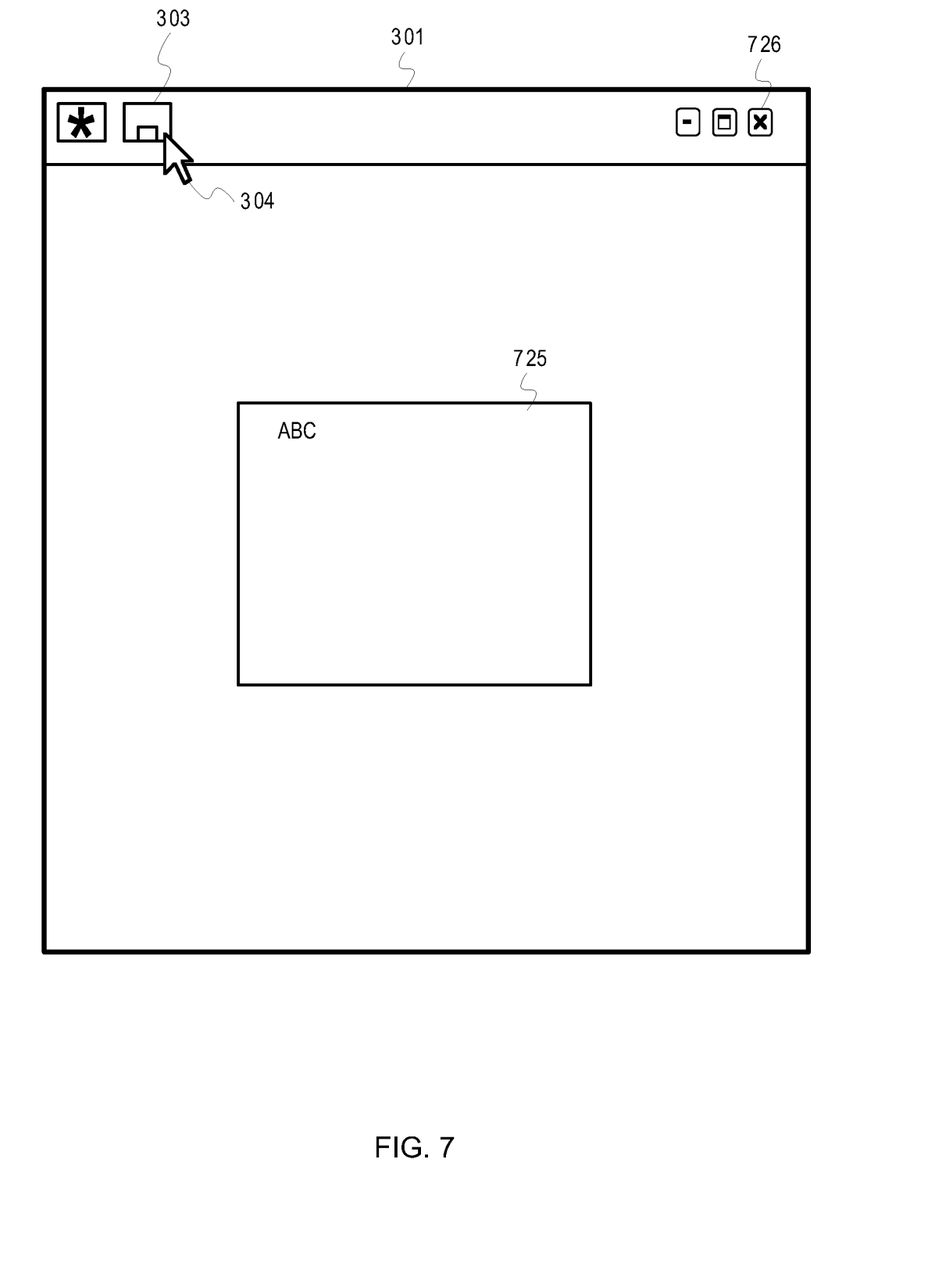
Figure 8:
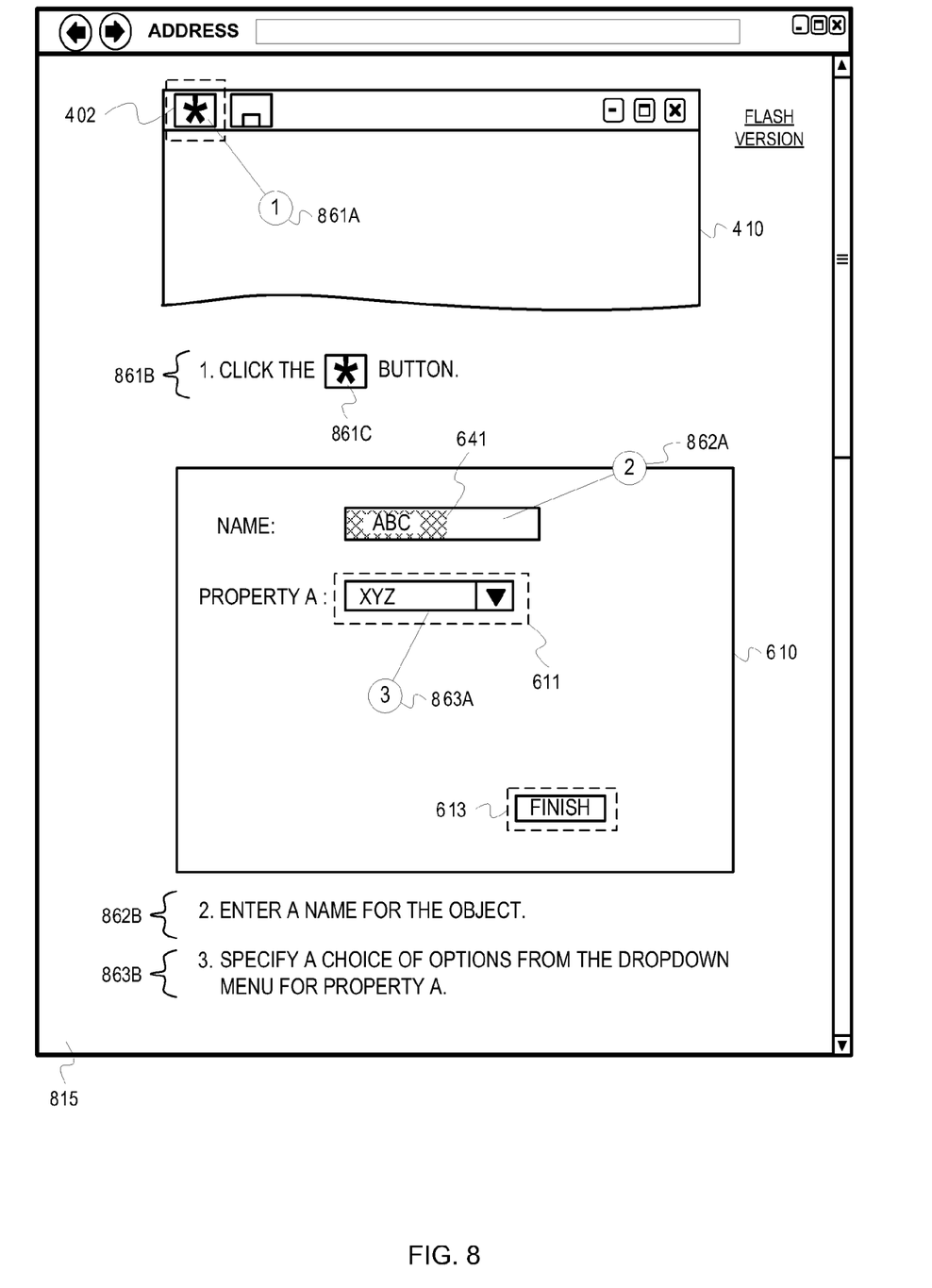

In some embodiments, the system can detect a trigger that causes the termination of the content-capture mode. For example, after the completion button 508 is activated in FIG. 6, the system can return to the window 301 as shown in FIG. 7, showing an object 725 that was created by previous activities in FIGS. 3 and 5. Referring to FIG. 7, the system can detect an additional activity (e.g., detect a mouse-click event on the second control 303). The second control 303 is a "Save" control that saves the object that was created via the previous activities described in FIGS. 3 and 5. When the system detects that the second control 303 is selected, the system can deduce that screen capturing is no longer needed and terminate the content-capture mode. In some embodiments, the system may continue capturing content until a different trigger occurs (e.g., until a close button 726 is activated.) In some embodiments, the system can pause content capturing. For example, the system can pause content capturing if a user causes the window 301 to become temporarily inactive (e.g., minimizes the window 301 or clicks outside of the window 301) and can automatically resume content capturing when the user reactivates the window 301 (e.g., the user un-minimizes the window 301 or clicks back into the window 301).

The system can further organize content captures into a unit (e.g., a file, a document, an image, a webpage, a video, an audio track, a slide-show, a spreadsheet, a map, a widget, an email, etc.). For instance, in FIG. 8, the system organizes the screen captures of FIGS. 4 and 6 into a webpage 815 in a chronological order in which the screen captures were taken. The webpage 815 includes the screen capture 410 and the screen capture 610. The screen captures 410 and 610 may include some, or all, of the annotations previously generated, such as the highlighting graphic 641, the graphical box 611, and the graphical box 613. In addition, in the embodiment shown in FIG. 8, the system does not include callout annotations that were previously indicated. Instead the system generates annotations 861A, 861B, 861C, 862A, 862B, 863A, and 863B. The annotation 861A is an indicator (e.g., the number "1") which indicates a first portion of the content that was modified, or interacted with. The annotation 861A also represents a common identifier, or indicator, that ties the annotation 861A to the annotation 861B, a textual summary that defines the activity as an instruction to follow in a tutorial presented on the webpage 815. The indicator can also be a letter, a symbol, an arrow, or some other distinctive image. Likewise, annotations 862A and 863A are subsequent numerals (i.e., "2," and "3"), which represent additional, and sequential, instructions to follow in the tutorial presented on the webpage 815. The annotations 862B and 863B are textual descriptions of the second and third instructions. Annotation 861C is a graphical representation of the depiction 402 of the first control 302. The system may also generate a dynamic presentation of the content captures (e.g., a video, an Adobe® Flash® animation, etc.), and integrate the dynamic presentation with the webpage 815 (e.g., via links associated with the annotations 861A, 861B, 861C, 862A, 862B, 863A, and 863B, via an alternate presentation of the tutorial via another webpage, etc.).

In some embodiments, the system utilizes pre-specified settings to determine when to initiate content-capturing, when to take content-captures, what is captured, what types of annotations to make, what types of organization to apply to content captures, etc. For example, in FIG. 9, a graphical user interface ("interface") 900 includes settings related to content capturing, annotations, etc. The interface 900 includes a first section 910 related to triggers that initiate or terminate a content-capture mode. Settings 901, for example, are related to a keystroke combination (e.g., Ctrl+F10) that a user specifies to trigger the content-capture mode. Settings 902 are related to a type of activity that initiates a trigger to end a content-capture mode (e.g., a "Save" or "Close" activity). Settings 903 specify a time period for the content-capture mode to run. Settings 904 specify a number of screens, panels, activities, etc. to capture until terminating a content-capture mode.

Figure 9:
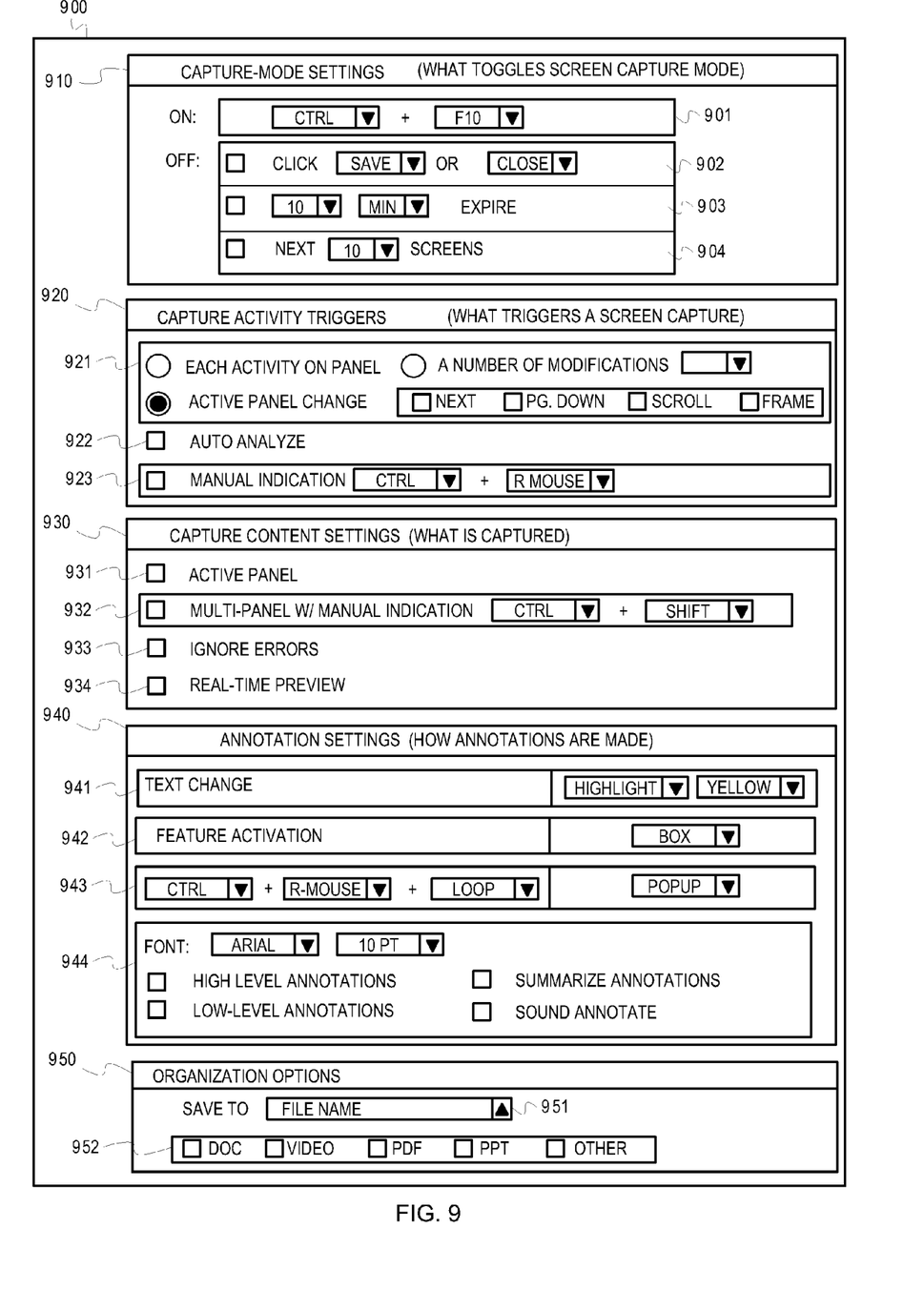

A second section 920 is related to activity triggers that cause a content-capture to occur during content-capture mode. Settings 921 specify to capture content either each time that an activity occurs or when an active panel changes via user input or user initiated events (e.g., specifies to generate a screen capture when a user clicks a "Next" button on a panel, when a user selects a "Page-Down" button, when a user clicks a "Scroll" field or scrolls a mouse wheel, when a user advances a video frame, etc.). In other words, via the settings 921, a user can pre-specify whether screen captures should be taken of a panel either (1) after each user activity during screen capture mode, (2) after a specific number of activities (e.g., after 5 modifications), or (3) only when an active panel is changed or deactivated (e.g., take a screen capture only when a user presses a "Next," "Finish," "OK," "Exit", etc. on an active panel). Settings 922 indicate that the system auto analyzes when to generate content-captures. Settings 923 indicate a trigger that a user can manually activate to generate a screen capture (e.g., a "Ctrl"+"Right Mouse Click").

A third section 930 specifies content that is captured. For example, settings 931 specific to capture content from an active panel. Settings 932 specify to capture content from multiple panels that are open, even if the panel is not active (e.g., capture content from multiple open windows that are selected vial a specific manual indicator, such as a "Ctrl"+"Shift"+Mouse click combination). Settings 933 indicate to ignore capturing of errors. Settings 934 indicate to provide a real-time preview of captured content. For example, the system can present a preview of a screen capture when taken for a user to review and/or modify before the system utilizes the screen capture in a file and/or finalizes annotations. In one example, the user can modify an annotation (e.g., change a color or position of a highlight or image annotation, change wording of annotation text, etc.) before the annotation is finalized, combined with a screen capture, included in a file, etc.

A fourth section 940 specifies annotations settings. For instance, settings 941 specify how to annotate text changes (e.g., via a specific color of highlighting). Settings 942 specify how to annotate an activation or selection of a feature, a control, a menu-option, etc. (e.g., generate a graphical box or border and place it around the activated feature). Settings 943 specify how to annotate a user-specified portion (e.g., if a user presses "Ctrl"+"Right Mouse" and performs a "Loop" motion with the mouse pointer around a portion of the content, the system will cause a "Pop-up" annotation to occur describing activity that recently occurred to the portion of the content). Additional settings 944 indicate a default text font to use in annotations, a degree of annotation (e.g., high-level versus low-level) whether to specify summary annotations in a document, whether to include sound annotations, etc.

A fifth section 950 specifies settings for organizing content captures. For example, settings 951 specify to save the content captures and annotations to a specific file name. Settings 952 specify to save types of files (e.g., a word processing document, a video, a portable document, a slide-show, etc.).

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include transitory, propagating signals.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
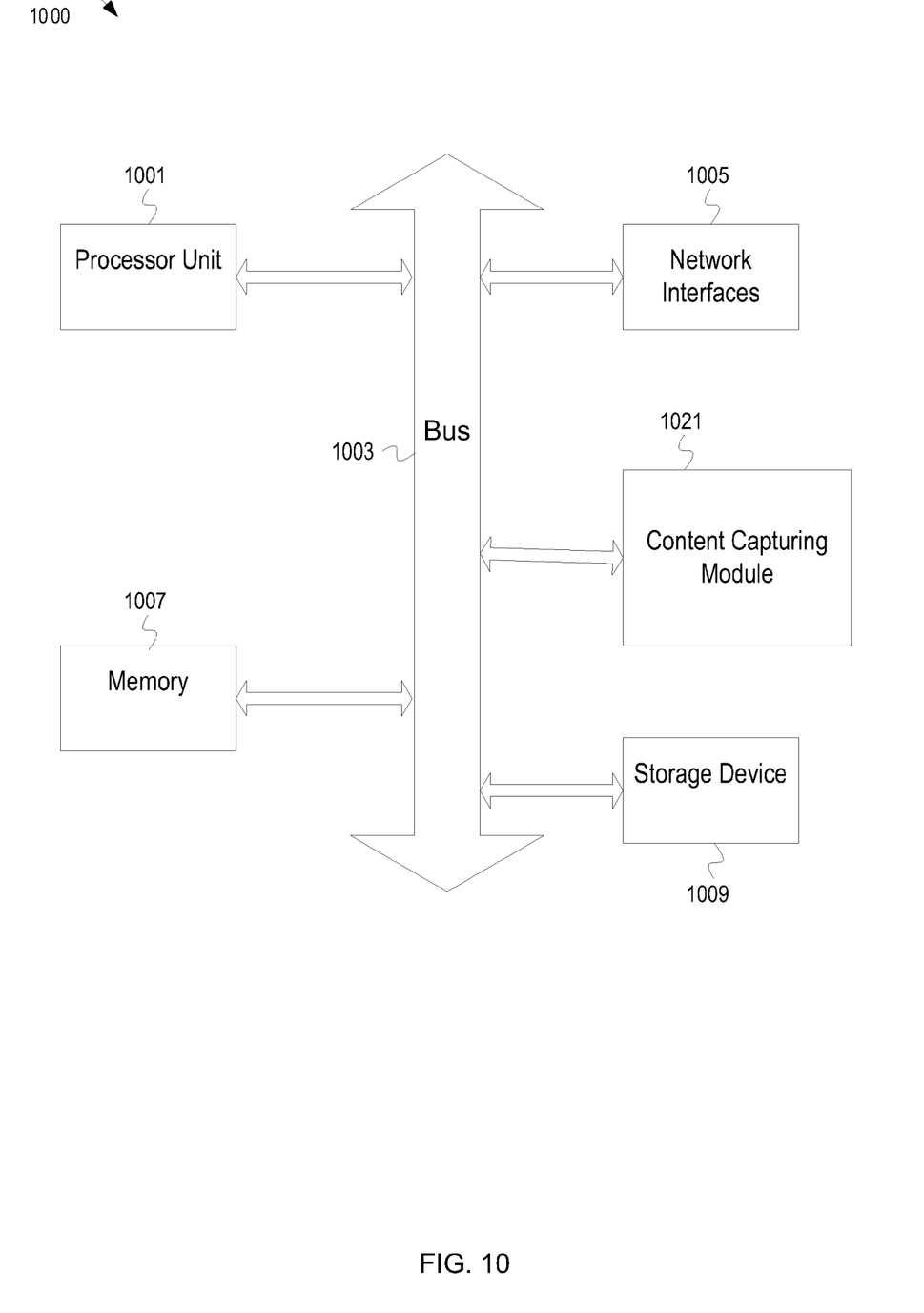
FIG. 10 depicts an example computer system.

FIG. 10 depicts an example computer system 1000. The computer system 1000 includes a processor unit 1001 (possibly including multiple processors, multiple cores, multiple nodes, and/or implementing multi-threading, etc.). The computer system 1000 includes memory 1007. The memory 1007 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media or computer readable storage media. The computer system 1000 also includes a bus 1003 (e.g., PCI bus, ISA, PCI-Express bus, HyperTransport® bus, InfiniBand® bus, NuBus bus, etc.), a network interface 1005 (e.g., an ATM interface, an Ethernet interface, a Frame Relay interface, SONET interface, wireless interface, etc.), and a storage device(s) 1009 (e.g., optical storage, magnetic storage, etc.). The computer system 1000 also includes a content capturing module 1021. The content-capturing module 1021 can automatically detect content interactions and/or modifications, generate content captures, automatically annotation the content captures, organize the content captures, etc. Any one of these functionalities may be partially (or entirely) implemented in hardware and/or on the processing unit 1001. For example, the functionality may be implemented with an application specific integrated circuit, in logic implemented in the processing unit 1001, in a co-processor on a peripheral device or card, etc. Further, realizations may include fewer or additional components not illustrated in FIG. 10 (e.g., video cards, audio cards, additional network interfaces, peripheral devices, etc.). The processor unit 1001, the storage device(s) 1009, and the network interface 1005 are coupled to the bus 1003. Although illustrated as being coupled to the bus 1003, the memory 1007 may be coupled to the processor unit 1001.

While the embodiments are described with reference to various implementations and exploitations, it will be understood that these embodiments are illustrative and that the scope of the inventive subject matter is not limited to them. In general, techniques for capturing content as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

As used herein, the term "or" is not exclusive unless otherwise explicitly noted. Thus, the phrase "at least one of A, B, or C" is satisfied by any element from the set {A, B, C} or any combination thereof.

What is claimed is:

1. A computer-implemented method comprising:
   initiating screen capture mode in response to detecting an indication that screen capture mode should be initiated;
   detecting a modification of content presented on a display, wherein the modification of the content is in response to a user action, wherein the user action occurs after said initiating the screen capture mode;
   in response to detecting the modification of the content, generating a plurality of screen captures, wherein at least one of the plurality of screen captures includes the modified content;
   identifying, by a content capturing module, a control corresponding to the user action, wherein said identifying the control corresponding to the user action comprises comparing a first of the plurality of screen captures with a second of the plurality of screen captures;
   organize the plurality of screen captures into a unit;
   determining, by the content capturing module, a boundary of the control corresponding to the user action; and
   adding, by the content capturing module, a graphical annotation to the first of the plurality of screen captures, wherein the graphical annotation indicates the control corresponding to the user action, wherein the graphical annotation is at least one of a callout including a stem adjacent to the control corresponding to the user action or a graphical box corresponding to the boundary of the control corresponding to the user action.

2. The computer-implemented method of claim 1, wherein the first of the plurality of screen captures is a first graphical image that depicts a state of the content after the modification occurred to the content, wherein the graphical annotation is a second graphical image, and wherein adding the graphical annotation to the first of the plurality of screen captures includes overlaying the second graphical image on the first graphical image, wherein the second graphical image is at least partly overlaid on the control corresponding to the user action or enclosing the control corresponding to the user action.

3. The computer-implemented method of claim 1, further comprising
combining the graphical annotation into the unit.

4. The computer-implemented method of claim 3, wherein the unit is a file, and wherein adding the graphical annotation to the first of the plurality of screen captures comprises:
storing the first of the plurality of screen captures in the file;
storing a textual summary in the file separate from the first of the plurality of screen captures, wherein the textual summary is a textual summary of at least one of the user action and the modification of the content; and
adding the textual summary to the graphical annotation.

5. The computer-implemented method of claim 1, wherein the unit comprises at least one of a file, a document, an image, a webpage, a video, an audio track, a slide-show, a spreadsheet, a map, a widget, and an email.

6. The computer-implemented method of claim 1, wherein said adding the graphical annotation to the first of the plurality of screen captures comprises:
generating a textual description of an activity performed via the user action; and
associating the textual description with the graphical annotation.

7. The computer-implemented method of claim 1, further comprising:
presenting a preview of the graphical annotation;
detecting an additional user action, wherein the additional user action is associated with the preview; and
modifying the preview in response to detecting the additional user action.

8. The computer-implemented method of claim 1, wherein the graphical annotation includes at least one of video and audio data.

9. A computer program product for automatically annotating screen captures, the computer program product comprising:
a non-transitory computer readable storage medium having computer readable program code embodied therewith, the computer readable program code comprising computer readable program code configured to,
initiate a screen capture mode in response to detection of an indication that screen capture mode should be initiated;
detect a plurality of interactions, via a plurality of user actions, with portions of content presented on a graphical user interface, wherein the portions of the content are configured to respond to the user actions, wherein the plurality of interactions occur after screen capture mode is initiated;
generate a series of screen captures of the content corresponding to the plurality of interactions, in response to a detection of the plurality of interactions;
compare a first of the series of screen captures with a second of the series of screen captures to identify at least one changed portion of content of the portions of content;
determine boundary of the at least one changed portion of content of the portions of content;
generate a plurality of graphical annotations in response to generation of the series of screen captures, wherein each of the plurality of graphical annotations describes a respective one of the plurality of interactions, wherein each of the plurality of graphical annotations is associated with at least one changed portion of content of the portions of content;
organize the series of screen captures into a unit; and
add the plurality of graphical annotations to the unit, wherein each of the plurality of graphical annotations is associated with a screen capture of the series of screen captures corresponding to the interaction of the plurality of interactions described by the respective graphical annotation, wherein each of the plurality of graphical annotations is at least one of a callout including a stem adjacent to a changed portion of content of the portions of content or a graphical box corresponding to the boundary of a changed portion of content of the portions of content.

10. The computer program product of claim 9, wherein the unit is at least one of a file, a document, an image, a webpage, a video, an audio track, a slide-show, a spreadsheet, a map, a widget, and an email.

11. The computer program product of claim 9, wherein the plurality of interactions cause the portions of the content to change state, and wherein the plurality of graphical annotations describe the changes of state.

12. The computer program product of claim 9, wherein the computer readable program code is further configured to superimpose each of the plurality of graphical annotations over the associated screen capture of the series of screen captures in the unit.

13. The computer program product of claim 9, wherein the computer readable program code configured to organize the series of screen captures into a unit comprises computer readable program code configured to combine the series of screen captures into a dynamic presentation.

14. The computer program product of claim 13, wherein said computer readable program code is further configured to
display each of the plurality of graphical annotations in the dynamic presentation when displaying the associated screen capture of the series of screen captures.

15. The computer program product of claim 9, wherein said computer readable program code is further configured to:
detect one or more errors associated with the plurality of interactions; and
exclude depictions of the one or more errors from the series of screen captures.

16. An apparatus comprising:
a processor; and
a computer readable storage medium having computer usable program code embodied therewith, the computer usable program code executable by the processor to cause the apparatus to,
initiate a content-capture mode in response to a first trigger;
detect a change of content from a first state to a second state during the content capture mode, wherein the content is configured to change state in response to user input;
generate a first representation of the content in the first state;
generate a second representation of the content in the second state in response to detecting the change from the first state to the second state;
comparing the first representation of the content with the second representation of the content to identify an area of focus associated with the user input, wherein the area of focus comprises a control corresponding to the user input;
determine a boundary of the area of focus;
generate a visual indicator in response to generating the second representation of the content, wherein the visual indicator indicates the change of the content from the first state to the second state, wherein the visual indicator is one of a callout and a graphical box;

combine, into a unit, the visual indicator, the first representation of the content, and the second representation of the content, wherein combining the visual indicator, the first representation of the content, and the second representation of the content comprises placement of a callout stem adjacent to the area of focus or a graphical box corresponding to the boundary of the area of focus; and terminate the content-capture mode in response to a second trigger.

17. The apparatus of claim 16, wherein the computer usable program code is further executable by the processor to cause the apparatus to:

display a preview of the visual indicator and the second representation of the content prior to combining the visual indicator with the second representation of the content;

detect an additional user input, wherein the additional user input indicates a customization of a characteristic of the visual indicator; and modify the visual indicator in accordance with the indication of the customization the additional user input.

18. The apparatus of claim 16, wherein the computer usable program code is further executable by the processor to cause the apparatus to use the visual indicator to highlight a textual change that occurs to a field associated with the content.

19. The apparatus of claim 16, wherein the computer usable program code being executable by the processor to cause the processor to combine, into the unit, the visual indicator, the first representation of the content, and the second representation of the content comprises computer usable program code executable by the processor to cause the apparatus to overlay a graphical border that encloses the area of focus associated with the user input.

20. The apparatus of claim 16, wherein the computer usable program code is further executable by the processor to cause the apparatus to:

generate an audio clip that indicates the change of the content from the first state to the second state; and combine the audio clip into the unit.

21. The apparatus of claim 16, wherein at least one of the first trigger and the second trigger is not an instruction to generate a screen capture.

22. A computer-implemented method comprising:

detecting a plurality of modifications that occur to one or more user-configurable portions of content displayed via a processor, wherein the plurality of modifications occur in response to a plurality of user inputs associated with the one or more user-configurable portions of the content, wherein the plurality of modifications occur while a screen capture mode is enabled;

generating a plurality of screen captures that depict one or more modifications of the plurality of modifications, in response to said detecting the plurality of modifications that occur to the one or more user-configurable portions of the content;

generating a plurality of graphical indicators, wherein each of the plurality of graphical indicators describes one or more of the plurality of modifications that occur to the one or more user-configurable portions of the content;

comparing a first of the plurality of screen captures with a second of the plurality of screen captures to identify boundaries associated with the one or more user-configurable portions of content;

superimposing the plurality of graphical indicators over portions of the plurality of screen captures, wherein the portions of the plurality of screen captures correspond to the boundaries associated with the one or more user-configurable portions of content; and organizing the plurality of screen captures and the plurality of graphical indicators into a unit.

23. The computer-implemented method of claim 22 further comprising:

analyzing the user inputs; and detecting, in response to the analyzing of the user inputs, the plurality of modifications that occur to the one or more user-configurable portions of content.

24. The computer-implemented method of claim 22 further comprising:

organizing the plurality of screen captures into a webpage; and associating, within the webpage, descriptions of each of the plurality of user inputs with each of the plurality of graphical indicators.

25. The computer-implemented method of claim 22 further comprising:

associating, within the unit, each of the plurality of graphical indicators with descriptions of one or more of each of the plurality of user inputs and each of the plurality of modifications.

* * * * *